US 9,286,647 B2

United States Patent
Lum et al.

(10) Patent No.: US 9,286,647 B2
(45) Date of Patent: Mar. 15, 2016

(54) PIXEL SHADER BYPASS FOR LOW POWER GRAPHICS RENDERING

(71) Applicant: NVIDIA Corporation, Santa Clara, CA (US)

(72) Inventors: Eric B. Lum, San Jose, CA (US); Justin Cobb, Toney, AL (US); Rui M. Bastos, Porto Alegre (BR); Christian Rouet, San Francisco, CA (US)

(73) Assignee: NVIDIA Corporation, Santa Clara, CA (US)

(*) Notice: Subject to any disclaimer, the term of this patent is extended or adjusted under 35 U.S.C. 154(b) by 294 days.

(21) Appl. No.: 13/795,693

(22) Filed: Mar. 12, 2013

(65) Prior Publication Data
US 2014/0267318 A1    Sep. 18, 2014

(51) Int. Cl.
| G06F 15/16 | (2006.01) |
| G06F 15/80 | (2006.01) |
| G06T 1/00 | (2006.01) |
| G06T 1/20 | (2006.01) |
| G06T 15/00 | (2011.01) |
| G06T 11/40 | (2006.01) |

(52) U.S. Cl.
CPC . *G06T 1/20* (2013.01); *G06T 11/40* (2013.01); *G06T 15/005* (2013.01)

(58) Field of Classification Search
CPC .................................. G06T 1/20; G06T 11/40
USPC .................................................. 345/502–506
See application file for complete search history.

(56) References Cited

U.S. PATENT DOCUMENTS

| 6,016,151 | A | 1/2000 | Lin |
| 7,385,609 | B1 | 6/2008 | Lindholm et al. |
| 2005/0174346 | A1* | 8/2005 | Park et al. ..................... 345/422 |
| 2008/0189524 | A1 | 8/2008 | Poon et al. |
| 2009/0073168 | A1 | 3/2009 | Jiao et al. |

OTHER PUBLICATIONS

Online encyclopedia "Wikipedia", Article from Feb. 25, 2013, to the phrase "shader" [researched on Dec. 8, 2014], 5 pages.
Online encyclopedia "Wikipedia", Article from Feb. 26, 2013, to the phrase "shading" [researched on Dec. 17, 2014], 6 pages.

* cited by examiner

*Primary Examiner* — Jacinta M Crawford
*Assistant Examiner* — Robert Craddock
(74) *Attorney, Agent, or Firm* — Artegis Law Group, LLP

(57) ABSTRACT

A computer-implemented method for drawing graphical objects within a graphics processing pipeline is disclosed. The method includes determining that a bypass mode for a first primitive is a no-bypass mode. The method further includes rasterizing the first primitive to generate a first set of rasterization results. The method further includes generating a first set of colors for the first set of rasterization results via a pixel shader unit. The method further includes rasterizing a second primitive to generate a second set of rasterization results. The method further includes generating a second set of colors for the second set of rasterization results without the pixel shader unit performing any processing operations on the second set of rasterization results. The method further includes transmitting the first set of pixel colors and the second set of pixel colors to a raster operations (ROP) unit for further processing.

20 Claims, 11 Drawing Sheets

CONCEPTUAL DIAGRAM

PIXEL SHADER BYPASS FOR LOW POWER GRAPHICS RENDERING

BACKGROUND OF THE INVENTION

1. Field of the Invention

Embodiments of the present invention relate generally to three-dimensional graphics processing pipelines and, more specifically, to a pixel shader bypass for low power graphics rendering.

2. Description of the Related Art

An application may sometimes issue commands to draw two-dimensional objects within a three-dimensional scene that is being rendered via a graphics processing pipeline. For example, an application may request that a graphics processing pipeline render constant color two-dimensional or textured two-dimensional polygons in order to display user interface elements or to display simple graphical elements within a three-dimensional rendered scene. There are several ways that graphics processing pipelines can display such two-dimensional objects.

In one approach, the application sends a command into the graphics processing pipeline to draw a polygon within the three-dimensional scene having specific desired characteristics. The desired two-dimensional object is then generated and displayed using the standard facilities of the graphics processing pipeline. One drawback of such an approach is that certain facilities of the graphics processing pipeline usually are not needed for drawing simple two-dimensional objects. Consequently, having the graphics processing pipeline generate two-dimensional objects wastes processing power.

In another approach, a two-dimensional blitter may be used to draw a two-dimensional object directly to the render target of the graphics processing pipeline, and the two-dimensional object is then displayed along with the rest of the data associated with the render target. One drawback of such an approach is that the two-dimensional blitter usually bypasses much or all of the graphics processing pipeline. Consequently, two-dimensional objects drawn via a two-dimensional blitter oftentimes are of lower quality than two-dimensional objects generated via a graphics processing pipeline. Another drawback of using a two-dimensional blitter is that coordinating operations between the two-dimensional blitter and the graphics processing pipeline is difficult, which may result in the graphics processing pipeline being idled and flushed in order to operate the two-dimensional blitter, thereby reducing performance.

As the foregoing illustrates, what is needed in the art is a method of displaying two-dimensional objects using lower power and without requiring the flushing and idling of a graphics processing pipeline.

SUMMARY OF THE INVENTION

A computer-implemented method for drawing graphical objects within a graphics processing pipeline is disclosed. The method includes determining that a bypass mode for a first primitive is a no-bypass mode. The method further includes rasterizing the first primitive to generate a first set of rasterization results. The method further includes generating a first set of colors for the first set of rasterization results via a pixel shader unit. The method further includes rasterizing a second primitive to generate a second set of rasterization results. The method further includes generating a second set of colors for the second set of rasterization results without the pixel shader unit performing any processing operations on the second set of rasterization results. The method further includes transmitting the first set of pixel colors and the second set of pixel colors to a raster operations (ROP) unit for further processing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
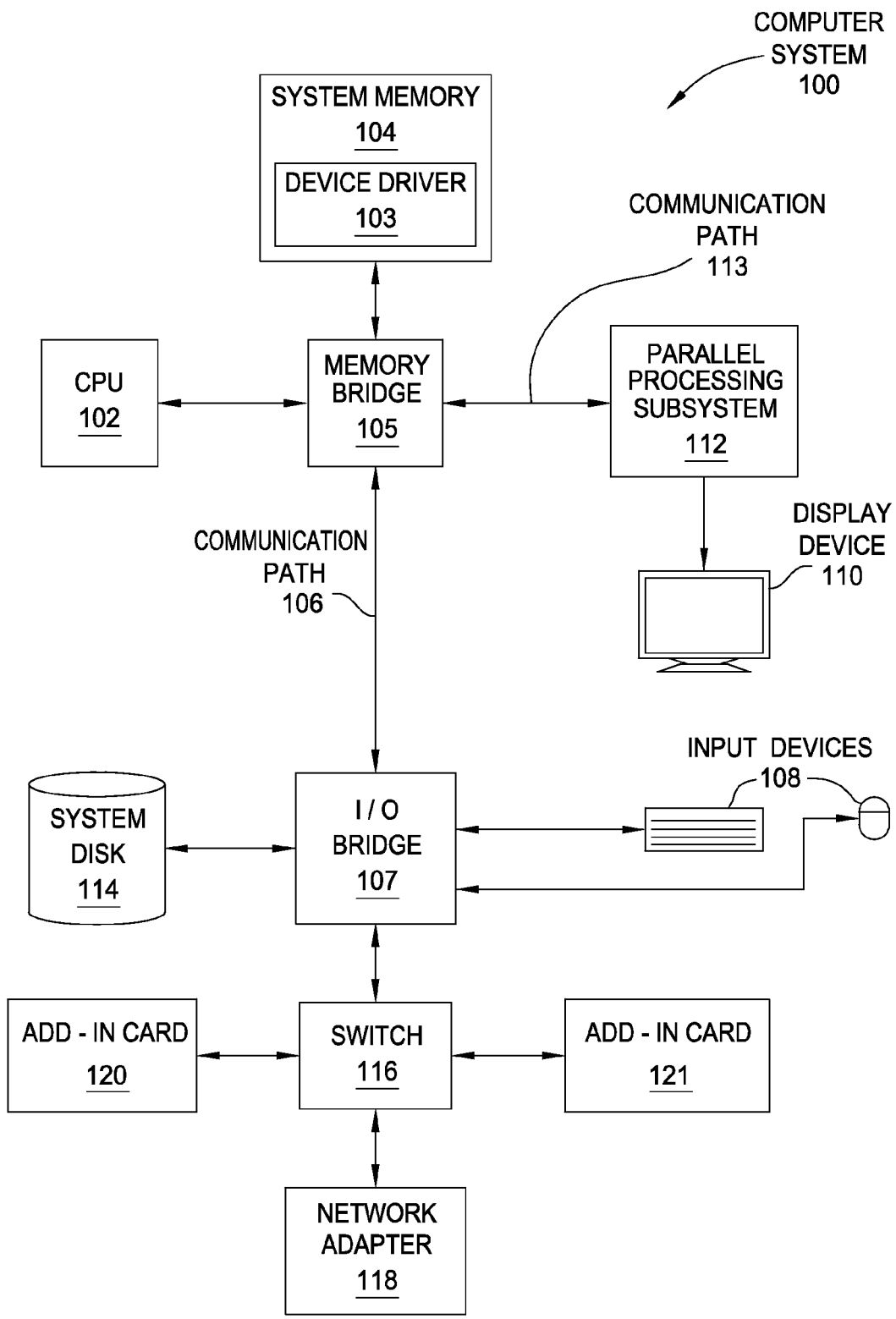
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
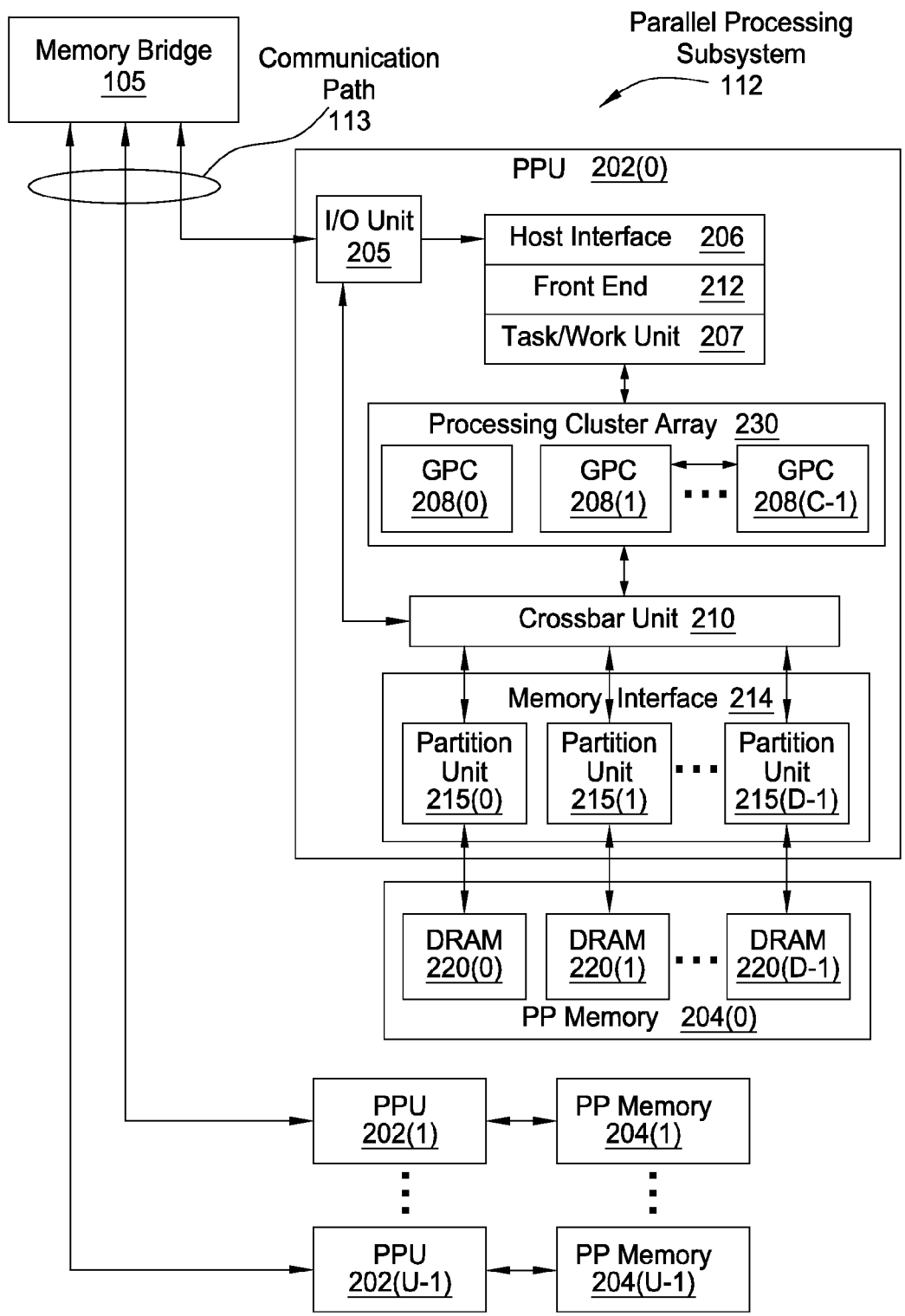
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
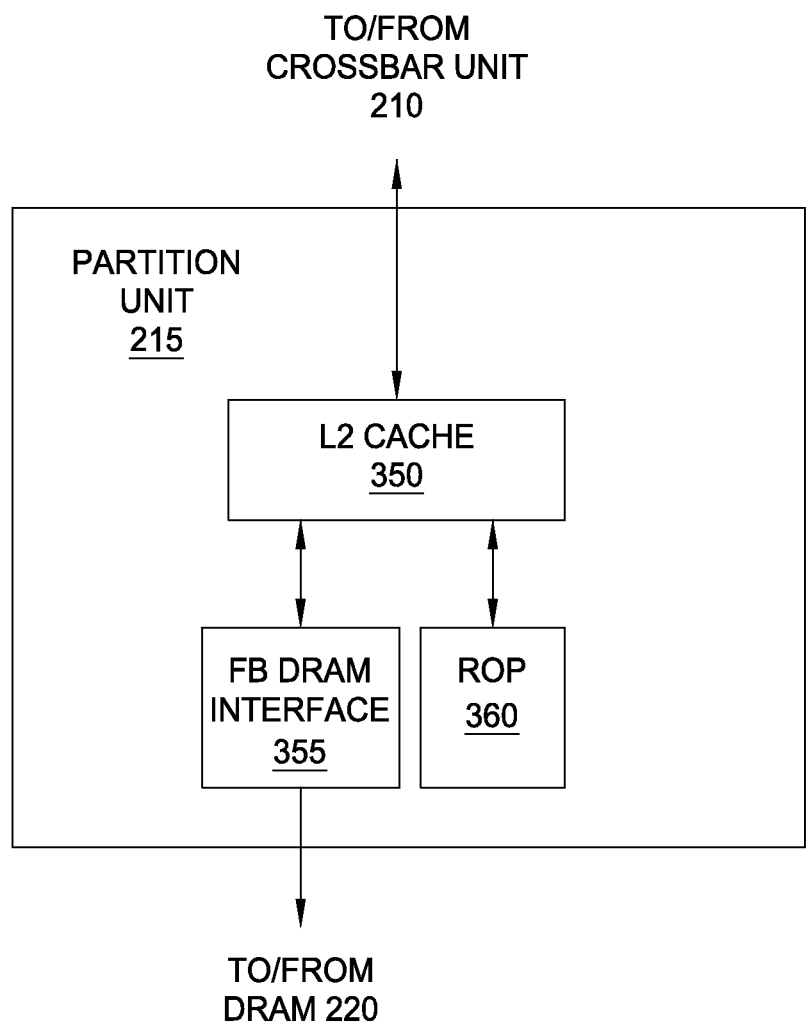
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
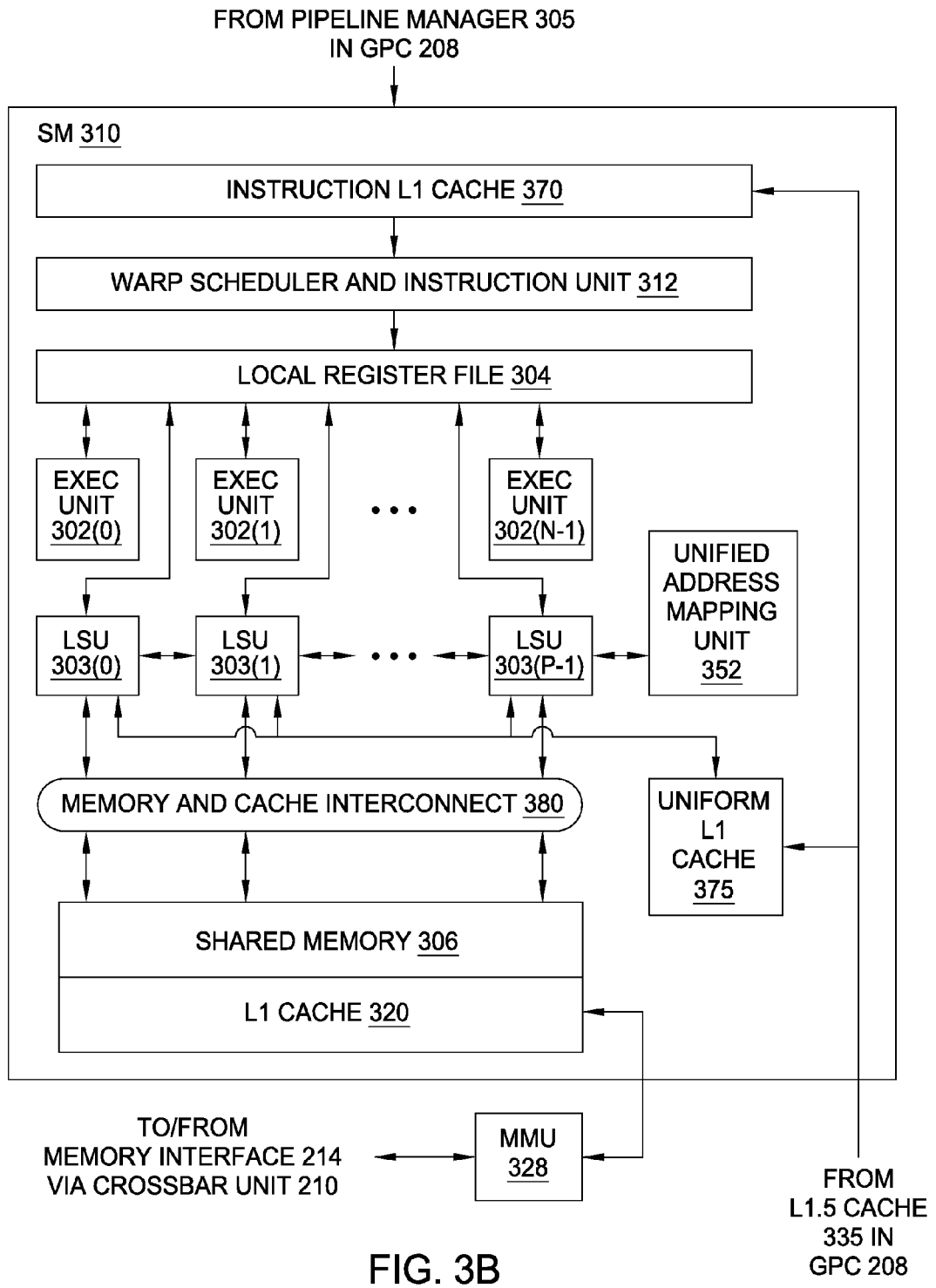
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes $\underline{M}$ streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
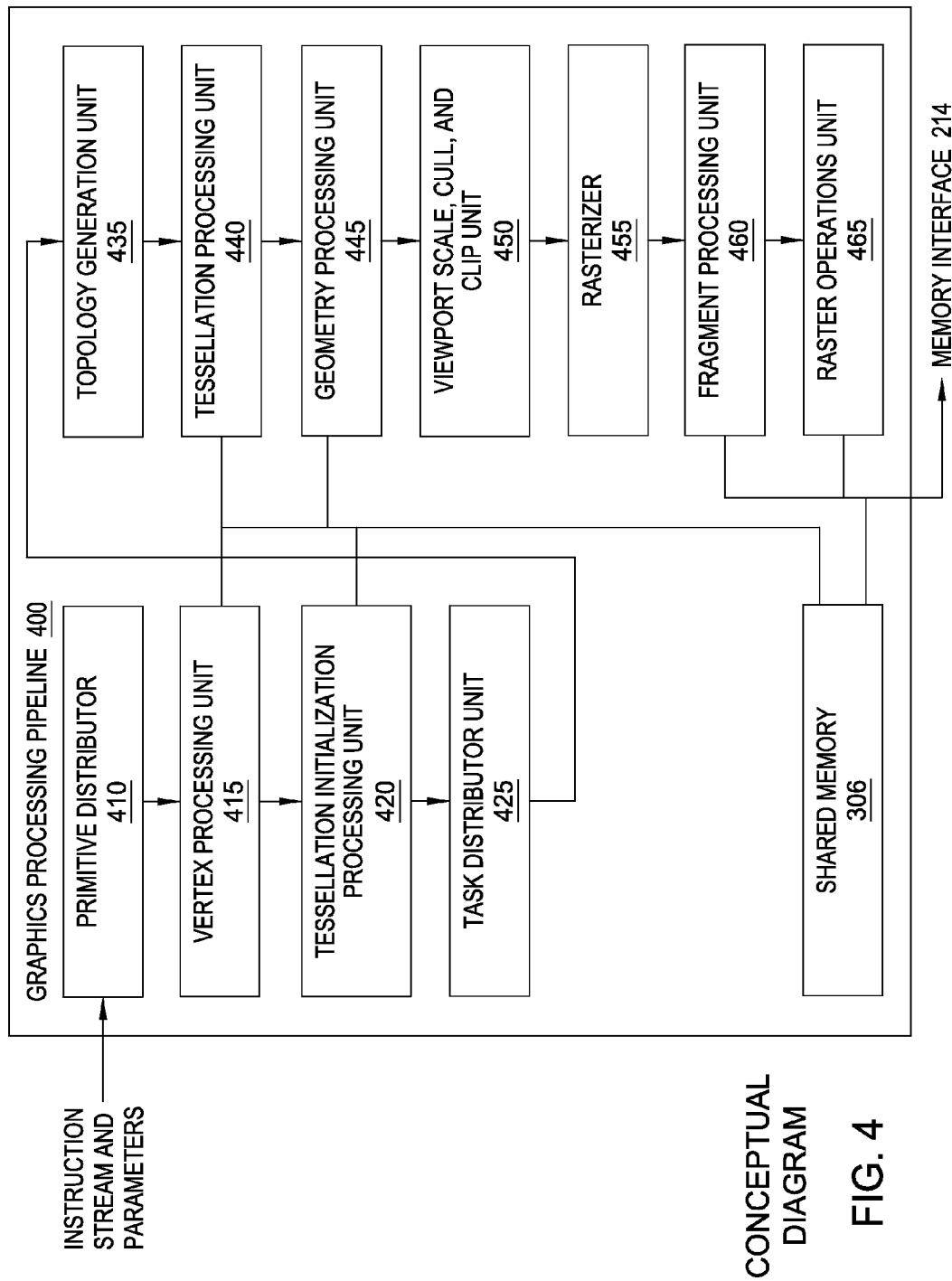
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a tessellation initialization processing unit 420, a tessellation processing unit 440, a geometry processing unit 445, and a fragment processing unit 460. The functions of primitive distributor 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215. Alternately, graphics processing pipeline 400 may be implemented using dedicated processing units for one or more functions.

The graphics processing pipeline 400 also includes a local memory that is shared among the graphics processing pipelines 400. For example, the graphics processing pipeline could use the shared memory 306 within the SM 310 as such a local memory. As further described below, inter-stage buffers (not shown) within the shared memory 306 are allocated and deallocated by the various processing units in the graphics processing pipeline 400 as needed. A processing unit reads input data from one or more inter-stage buffers, processes the input data to produce output data, and stores the resulting output data in one or more inter-stage buffers. A subsequent processing unit may read this resulting output data as input data for the subsequent processing unit. The subsequent processing unit processes the data and stores output data in one or more inter-stage buffers, and so on. The shared memory 306 and various other stages of the graphics processing pipeline connect with external memory via the memory interface 214.

The primitive distributor 410 processing unit collects vertex data for high-order surfaces, primitives, and the like, and outputs the vertex data, including the vertex attributes, to vertex processing unit 415. In some embodiments, the primitive distributor 410 includes a vertex attribute fetch unit (not shown) that retrieves the vertex attributes and stores the vertex attributes in the shared memory 306. The vertex processing unit 415 is a programmable execution unit that is configured to execute vertex shader programs, lighting and transforming vertex data as specified by the vertex shader programs. For example, the vertex processing unit 415 may be programmed to transform the vertex data from an object-based coordinate representation (object space) to an alternatively based coordinate system such as world space or normalized device coordinates (NDC) space. The vertex processing unit 415 may read data that is stored in shared memory 306, L1 cache 320, parallel processing memory 204, or system memory 104 by primitive distributor 410 for use in processing the vertex data. The vertex processing unit 415 stores processed vertices in the inter-stage buffers within the shared memory 306.

The tessellation initialization processing unit 420 is a programmable execution unit that is configured to execute tessellation initialization shader programs. The tessellation initialization processing unit 420 processes vertices produced by the vertex processing unit 415 and generates graphics primitives known as patches. The tessellation initialization processing unit 420 also generates various patch attributes. The tessellation initialization processing unit 420 then stores the patch data and patch attributes in the inter-stage buffers within the shared memory 306. In some embodiments, the tessellation initialization shader program may be called a hull shader or a tessellation control shader.

The task generation unit 425 retrieves data and attributes for vertices and patches from the inter-stage buffers of the shared memory 306. The task generation unit 425 generates tasks for processing the vertices and patches for processing by later stages in the graphics processing pipeline 400.

The task distributor 430 redistributes the tasks produced by the task generation unit 425. The tasks produced by the various instances of the vertex shader program and the tessellation initialization program may vary significantly between one graphics processing pipeline 400 and another. The task distributor 430 redistributes these tasks such that each graphics processing pipeline 400 has approximately the same workload during later pipeline stages.

The topology generation unit 435 retrieves tasks distributed by the task distributor 430. The topology generation unit 435 indexes the vertices, including vertices associated with patches, and computes texture coordinates corresponding to the vertices. The topology generation unit 435 then stores the indexed vertices in the inter-stage buffers within the shared memory 306.

The tessellation processing unit 440 is a programmable execution unit that is configured to execute tessellation shader programs. The tessellation processing unit 440 reads input data from and writes output data to the inter-stage buffers of the shared memory 306. This output data in the inter-stage buffers is passed to the next shader stage, the geometry processing unit 445 as input data. In some embodiments, the tessellation shader program may be called a domain shader or a tessellation evaluation shader.

The geometry processing unit 445 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit 445 may be programmed to subdivide the graphics primitives into one or more new graphics primitives and calculate parameters, such as plane equation coefficients, that are used to rasterize the new graphics primitives.

In some embodiments, the geometry processing unit 445 may also add or delete elements in the geometry stream. The geometry processing unit 445 outputs the parameters and vertices specifying new graphics primitives to a viewport scale, cull, and clip unit 450. The geometry processing unit 445 may read data that is stored in shared memory 306, parallel processing memory 204 or system memory 104 for use in processing the geometry data. The viewport scale, cull, and clip unit 450 performs clipping, culling, and viewport scaling and outputs processed graphics primitives to a rasterizer 455.

The rasterizer 455 scan converts the new graphics primitives and outputs fragments and coverage data to fragment processing unit 460. Additionally, the rasterizer 455 may be configured to perform z culling and other z-based optimizations.

The fragment processing unit 460 is a programmable execution unit that is configured to execute fragment shader programs, transforming fragments received from the rasterizer 455, as specified by the fragment shader programs. For example, the fragment processing unit 460 may be programmed to perform operations such as perspective correction, texture mapping, shading, blending, and the like, to produce shaded fragments that are output to raster operations unit 465. The fragment processing unit 460 may read data that is stored in shared memory 306, parallel processing memory 204 or system memory 104 for use in processing the fragment data. Fragments may be shaded at pixel, sample, or other granularity, depending on the programmed sampling rate.

The raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Pixel Shader Bypass for Low Power Graphics Rendering

FIGS. 5A-5D illustrate a graphics processing pipeline 400 configured to implement four different pixel shader bypass modes. Pixel shader 535 is an execution unit within fragment processing unit 460 that executes pixel shading programs. Pixel shader 535 includes a programmable execution core for executing pixel shading programs, and fragment processing unit 460 includes additional fixed function hardware.

To implement the four different pixel shader bypass modes, the graphics processing pipeline 400 switches into one of the four configurations depicted in FIGS. 5A-5D. In the bypass mode depicted in FIG. 5A, pixel shader 535 executes pixel programs to process fragments and is thus not bypassed, while in the configurations depicted in FIGS. 5B-5D, pixel shader 535 does not execute pixel programs and is thus bypassed. While pixel shader 535 does not execute pixel shader programs for one primitive, pixel shader 535 may be idled, or pixel shader 535 may execute pixel shader programs for another primitive, thereby increasing performance, and/or reducing power consumption.

Graphics processing pipeline 400 switches between the configurations depicted in FIGS. 5A-5D on a primitive-by-primitive basis. To enter into one of the configurations, graphics processing pipeline 400 receives an instruction to draw a primitive and an indication of a corresponding pixel shader bypass mode. Subsequently, graphics processing pipeline 400 enters one of the configurations depicted in FIGS. 5A-5D, that corresponds to the pixel shader bypass mode that graphics processing pipeline 400 receives. The configurations are described in greater detail below with respect to FIGS. 5A through 5D.

Figure 5A:
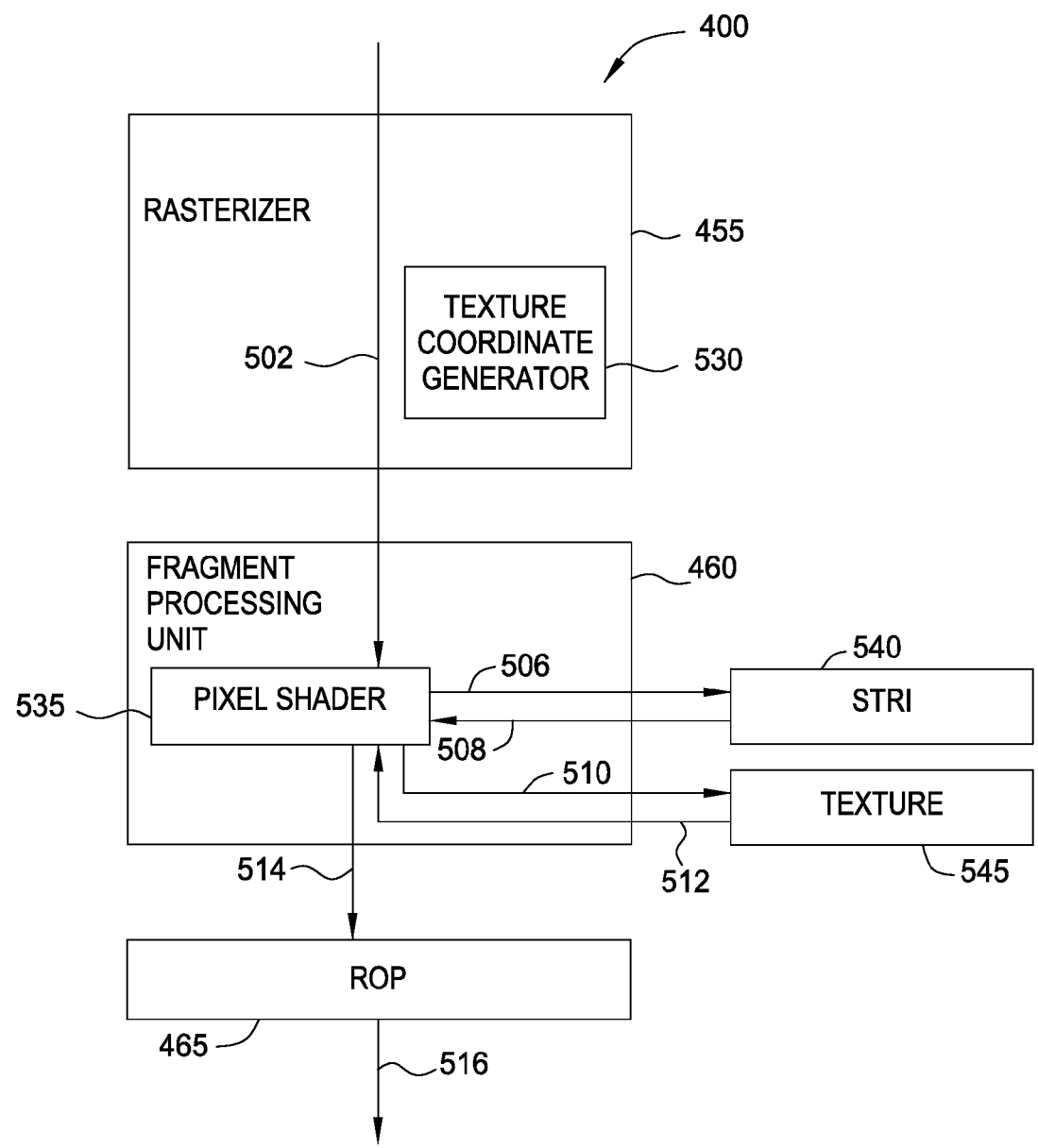
FIG. 5A illustrates a graphics processing pipeline configured to implement a no-bypass mode, according to one embodiment of the present invention.

FIG. 5A illustrates a graphics processing pipeline 400 configured to implement a no-bypass mode, according to one embodiment of the present invention. As shown, the graphics processing pipeline 400 configured to implement the no-bypass mode includes rasterizer 455, fixed-point texture coordinate generator unit 530, fragment processing unit 460, pixel shader unit 535, ROP unit 465, texture coordinate generator unit (STRI unit) 540, and texture unit 545, as well as data paths 502, 506, 508, 510, 512, 514, and 516.

When the graphics processing pipeline 400 is configured to implement the no-bypass mode, rasterizer 455 rasterizes geometry data to generate fragments and coverage data for primitives. Thus data flow 502 is processed by rasterizer 455 and flows to pixel shader 535 in fragment processing unit 460. Programmable pixel shader 535 runs pixel shader programs to produce shaded fragments. While running pixel shader programs, if a primitive has a texture applied, pixel shader 535 sends pixel coordinate requests 506 to texture coordinate generator unit 540 (STRI unit) and receives texture coordinates 508 from STRI unit 540. Pixel shader 535 then sends texture coordinates in data flow 510 to texture unit 545 and receives color values 512 corresponding to the sent texture coordinates 510. Pixel shader applies color values 512 to pixels processed by pixel shader 535, performs other tasks corresponding to the functions of pixel shader 535, and sends resulting fragments 514 to ROP unit 465 for further processing, such as color blending. ROP outputs values 516 to be written to a frame buffer or for additional processing.

Figure 5B:
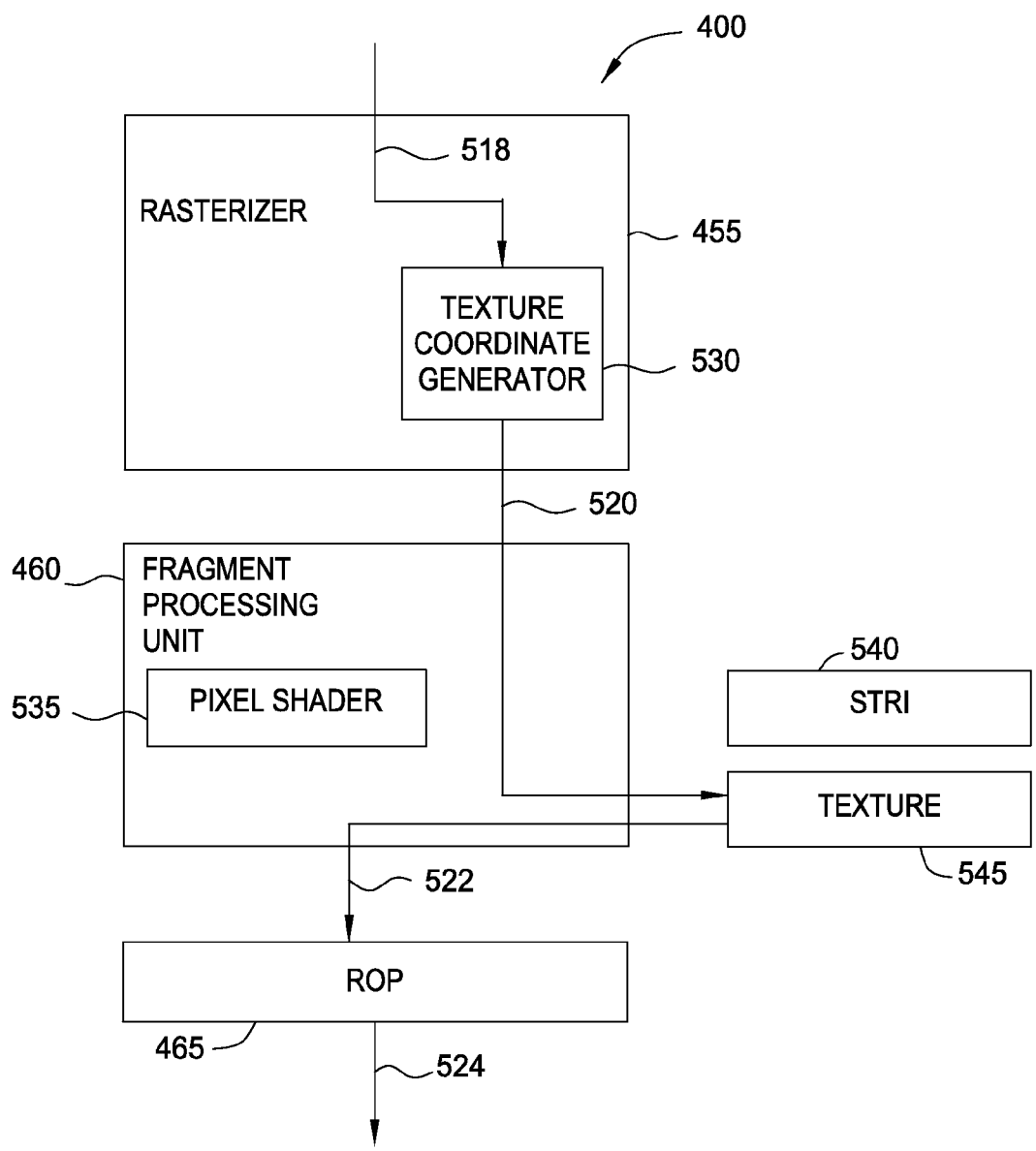
FIG. 5B illustrates a graphics processing pipeline configured to implement a textured bypass mode, according to one embodiment of the present invention.

FIG. 5B illustrates a graphics processing pipeline 400 configured to implement a textured bypass mode, according to one embodiment of the present invention. As shown, the graphics processing pipeline 400 configured to implement the textured bypass mode includes rasterizer 455, fixed-point texture coordinate generator unit 530, fragment processing unit 460, pixel shader unit 535, ROP unit 465, texture coordinate generator unit (STRI unit) 540, and texture unit 545, as well as data paths 518, 520, 522, and 524.

When the graphics processing pipeline 400 is configured to implement the textured bypass mode, rasterizer 455 receives information regarding a "flat" two-dimensional object for rasterization on target surface, and a texture to be applied to the two-dimensional object. The "flat" two-dimensional object is parallel to the render target for the "flat" two-dimensional object. The "flat" two-dimensional object may be any two-dimensional shape such as a quadrilateral, a triangle, other polygon, or other two-dimensional shape. In various embodiments, "flat" two-dimensional shapes may be useful for displaying textured graphical user interface (GUI) elements, displaying simple graphics for applications such as casual gaming, or for other purposes.

To render a "flat" two-dimensional object when the graphics processing pipeline is configured to implement the textured bypass mode, rasterizer 455 calculates coverage data for the "flat" two-dimensional object, and outputs fragments and coverage data in data flow 520. Because the two-dimensional object is parallel to the render target, the calculations for generating texture coordinates are relatively simple. Fixed-point texture coordinate generator 530 therefore generates fixed point texture coordinates based on the shape of the two-dimensional object, and a chosen texture. In one embodiment, fixed-point texture coordinate generator 530 generates fixed point texture coordinates via fixed-point arithmetic.

Once fixed-point texture coordinate generator 530 calculates texture coordinates, data from rasterizer 455, including coverage data and texture coordinates are provided along path 520. Texture coordinates are provided to texture unit 545, which in response provides colors corresponding to the texture coordinates. Data 522, including colors provided by texture unit 545, are provided to ROP unit 465, and output from ROP unit 524 is emitted for further processing and for eventual writing to the render target.

Data paths 520 and 522 travel through fragment processing unit 460, indicating that some fixed function hardware within fragment processing unit 460, such as color converters or the like, processes data in data paths 520 and 522. However pixel shader 535 does not process data in data paths 520 and 522. In some embodiments, data paths 520 and 522 do not travel through fragment processing unit 460.

When the graphics processing pipeline 400 is configured to implement textured bypass mode, the pixel shader 535 does not execute pixel shader programs for the primitive being rendered. Further, a texture coordinate generator unit (STRI) 540 does not calculate texture coordinates. Thus pixel shader 535 does not participate in rendering the primitive. In some embodiments, pixel shader 535 is idled, reducing power consumption. In other embodiments, pixel shader 535 performs calculations for other primitives. In some embodiments, because the flat textured primitive is parallel to the render target, units upstream of rasterizer 455 do not process data for a primitive that is processed in textured bypass mode. For example, geometry processing unit 445 may not process data for a primitive that is processed in textured bypass mode.

Figure 5C:
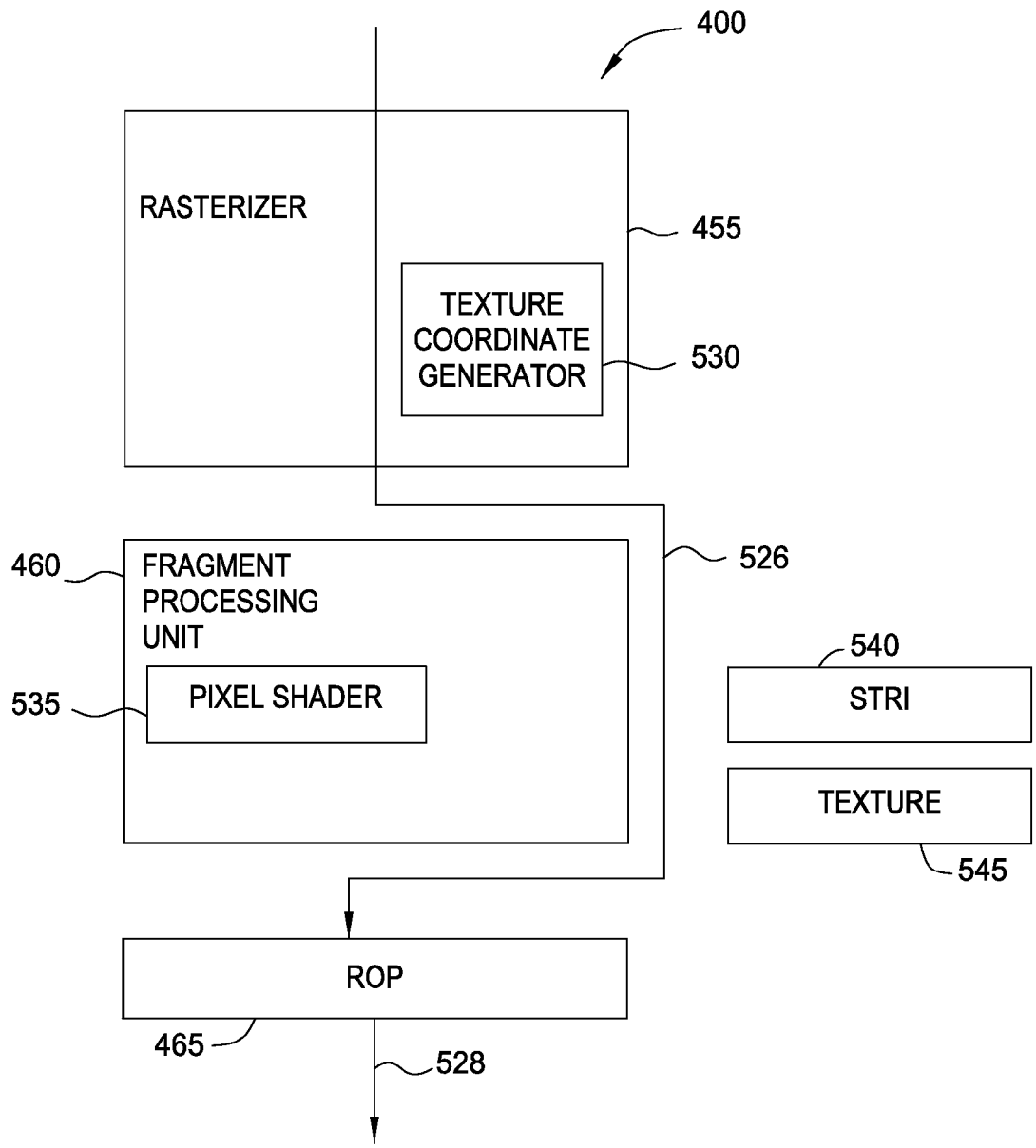
FIG. 5C illustrates a graphics processing pipeline configured to implement a fixed color bypass mode, according to one embodiment of the present invention.

FIG. 5C illustrates graphics processing pipeline 400 configured to implement a fixed color bypass mode, according to one embodiment of the present invention. As shown, the graphics processing pipeline 400 configured to implement the fixed color bypass mode includes rasterizer 455, fixed-point texture coordinate generator unit 530, fragment processing unit 460, pixel shader unit 535, ROP unit 465, texture coordinate generator unit (STRI unit) 540, and texture unit 545, as well as data paths 526 and 528.

When the graphics processing pipeline 400 is configured to implement the fixed color bypass mode, rasterizer 455 receives information regarding a fixed-color two-dimensional object to be rasterized to a target surface, and a fixed color to be applied to the fixed-color two-dimensional object. The fixed-color two-dimensional object is not limited in terms of position and orientation and is therefore not necessarily parallel to the render target. In various embodiments, the fixed-color two-dimensional object may be useful for displaying fixed-color graphical user interface (GUI) elements, displaying simple graphics for applications such as casual gaming, or for other purposes.

Rasterizer 455 rasterizes the primitive, which includes generating fragments and coverage data for pixels and samples. Rasterizer 455 then assigns the fixed-color to the fragments output by rasterizer 455. The fragments are sent to ROP unit 465 in data flow 526. ROP unit 465 processes the fragments and emits data flow 528. No texture is applied, and therefore fixed-point texture coordinate generator 530, texture coordinate generator unit (STRI) 540, texture unit 545, and pixel shader 535 are bypassed. A two-dimensional object in three-dimensional space is thereby rendered with a single fixed color. By bypassing pixel shader 535, graphics processing pipeline 400 renders objects without consuming power for the pixel shader 535.

Figure 5D:
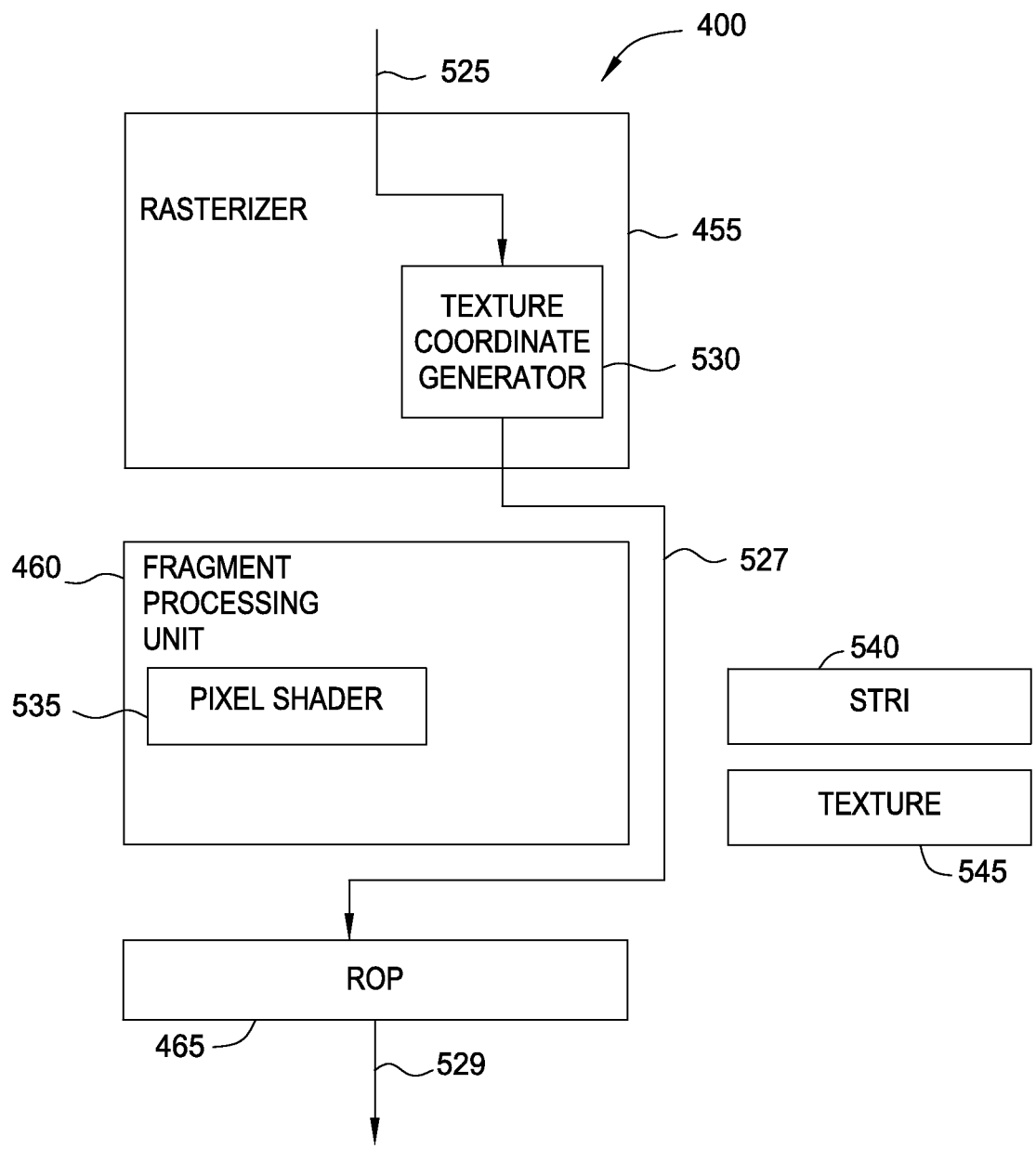
FIG. 5D illustrates a graphics processing pipeline configured to implement a gradient color bypass mode, according to one embodiment of the present invention.

FIG. 5D illustrates a graphics processing pipeline 400 configured to implement a gradient color bypass mode, according to one embodiment of the present invention. As shown, the graphics processing pipeline 400 configured to implement the gradient color bypass mode includes rasterizer 455, fixed-point texture coordinate generator unit 530, fragment processing unit 460, pixel shader unit 535, ROP unit 465, texture coordinate generator unit (STRI unit) 540, and texture unit 545, as well as data paths 525, 527, and 529.

When the graphics processing pipeline 400 is configured to implement the gradient color bypass mode, rasterizer 455 receives information 525 regarding a gradient color two-dimensional object to be rasterized to a target surface, and a gradient color to be applied to the gradient color two-dimensional object. The gradient color two-dimensional object is parallel to the render target for the gradient color two-dimensional object, similar to the flat two-dimensional object processed by the graphics processing pipeline 400 configured to implement textured bypass mode. The gradient color two-dimensional object may be any two-dimensional shape such as a quadrilateral, a triangle, other polygon, or other two-dimensional shape. In various embodiments, gradient color two-dimensional shapes may be useful for displaying textured graphical user interface (GUI) elements, displaying simple graphics for applications such as casual gaming, or for other purposes.

Rasterizer 455 calculates coverage data for the gradient color two-dimensional object. Fixed point texture coordinate generator 530 calculates gradient colors for fragments for gradient color two-dimensional object. Rasterizer 455 outputs fragments and coverage data in data flow 527. ROP unit 465 processes the data and emits data flow 529.

Because the two-dimensional object is parallel to the render target, the calculations for generating gradient colors are relatively simple. The calculations for generating gradient colors are similar to the calculations for generating texture coordinates for flat two-dimensional object in when the graphics processing pipeline 400 is configured to implement the textured bypass mode. Specifically, for texture coordinates processed by graphics processing pipeline configured to implement the textured bypass mode, fixed point texture coordinate generator 530 linearly interpolates between screen coordinates to determine texture coordinates. When the graphics processing pipeline is configured to implement gradient color bypass mode, fixed point texture coordinate generator 530 linearly interpolates between color values to produce gradient color values. Because fixed-point texture coordinate generator 530 generates gradient colors, pixel shader 535 is bypassed, thus saving processing power.

In some embodiments, because the gradient color primitive is parallel to the render target, units upstream of rasterizer 455 do not process data for a primitive that is processed in gradient color bypass mode. For example, geometry processing unit 445 may not process data for a primitive that is processed in gradient color bypass mode.

It will be appreciated that the architecture described herein is illustrative only and that variations and modifications are possible. In one example, when the graphics processing pipeline 400 is configured to implement textured bypass mode, data flows 520 and 522 may not travel through fragment processing unit 460. In another example, certain units in graphics processing pipeline 400 may be bypassed in certain configurations. For example, geometry processing unit 445 may be bypassed when the graphics processing pipeline 400 is configured to implement textured bypass mode and in gradient color bypass mode.

Figure 6:
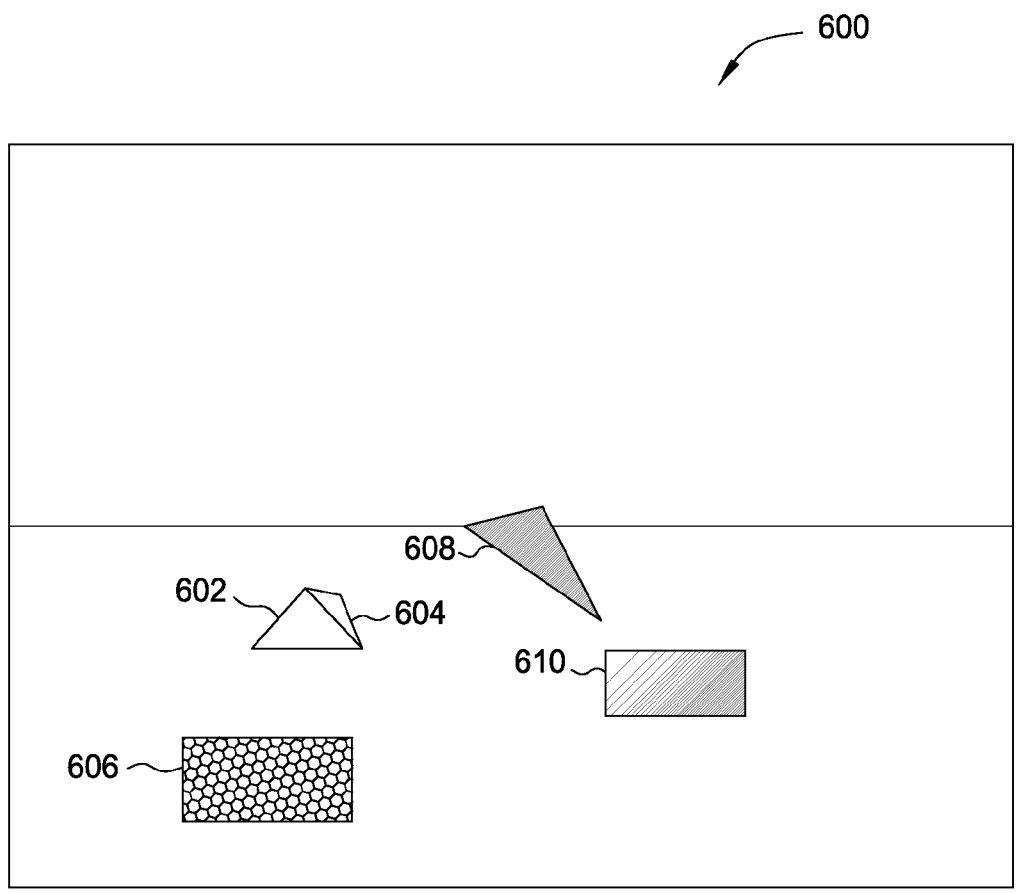
FIG. 6 depicts an example scene than can be rendered by a graphics processing pipeline configured according to one or more embodiments of the present invention.

FIG. 6 depicts an example scene 600 rendered by graphics processing pipeline 400, according to one embodiment of the present invention. As shown, the scene 600 includes primitives 602, 603 drawn by graphics processing pipeline 400 configured to implement no-bypass mode, primitive 606 drawn by graphics processing pipeline 400 configured to implement textured bypass mode, primitive 608 drawn by graphics processing pipeline 400 configured to implement fixed color bypass mode, and primitive 610 drawn by graphics processing pipeline 400 configured to implement gradient color bypass mode.

Primitives 602 and 604 are at an angle with respect to the render target (the screen). Primitives 602 and 604 are processed by graphics processing pipeline 400 configured to implement no-bypass mode 500, meaning that pixel shader 535 executes pixel shading programs for primitives 602 and 604.

Primitive 606 is parallel to the plane of the render target (the screen). Graphics processing pipeline 400 configured to implement in textured bypass mode processes primitive 606. When graphics processing pipeline 400 is configured to implement textured bypass mode, texture coordinate generator 530 generates texture coordinates for primitive 606. Therefore, pixel shader 535 is bypassed.

Primitive 608 is at an angle with respect to the render target (the screen). Graphics processing pipeline 400 configured to implement fixed-color bypass mode processes primitive 608. Therefore, pixel shader 535 is bypassed.

Finally, primitive 610 is parallel to the plane of the render target (the screen). Graphics processing pipeline 400 configured to implement gradient color bypass mode processes primitive 610. Therefore, pixel shader 535 is bypassed.

Figure 7:
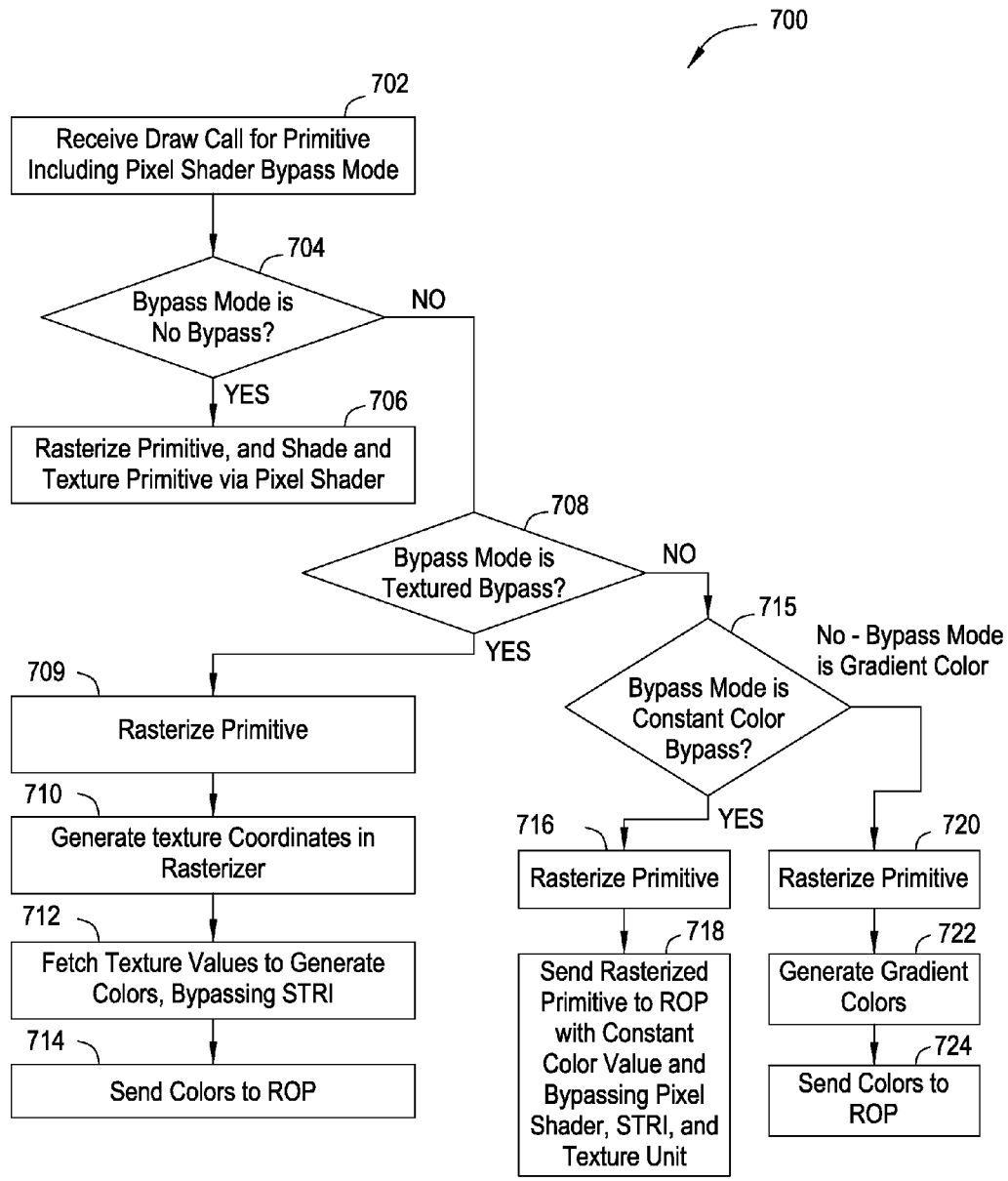
FIG. 7 is a flow diagram of method steps for generating fragment data in a graphics processing pipeline configured to implement a bypass mode, according to one embodiment of the present invention.

FIG. 7 is a flow diagram of method steps for generating fragment data in a graphics processing pipeline configured to implement a bypass mode, according to one embodiment of the present invention. Although the method steps are described in conjunction with FIGS. 1-5D, persons skilled in the art will understand that any system configured to perform the method steps, in any order, falls within the scope of the present invention.

As shown, a method 700 begins at step 702, where the graphics processing pipeline 400 receives an instruction to draw a primitive that indicates a bypass mode to implement. The bypass mode can be a textured bypass mode, a fixed color bypass mode, a no-bypass mode, or a gradient color bypass mode. In step 704, graphics processing pipeline 400 determines whether the bypass mode is a no-bypass mode. If the bypass mode is a no-bypass mode, the method proceeds to step 706, and graphics processing pipeline 400 processes the instruction to draw the primitive without bypassing a pixel shader 535. Specifically, graphics processing pipeline 400 rasterizes the primitive, and shades and textures primitive via pixel shader 535.

Referring back to step 704, if the bypass mode is not a no-bypass mode, the method proceeds to step 708. In step 708, the graphics processing pipeline 400 determines whether the bypass mode is a textured bypass mode. If the bypass mode is a textured bypass mode, the method proceeds to step 709. In step 709, rasterizer 455 rasterizes the primitive to determine rasterization results such as fragments and coverage data. In step 710, a fixed-point texture coordinate generator 530 generates texture coordinates for the primitive. In step 712, the fixed-point texture coordinate generator 530 sends texture coordinates to texture unit 545 to determine colors to apply to the primitive. In step 714, texture unit 545 sends determined colors to ROP unit 465 for processing by ROP unit 465.

Referring back to step 708, if the bypass mode is not a textured bypass, then the method proceeds to step 715. In step 715, the graphics processing pipeline 400 determines whether the bypass mode is a constant color bypass mode. If the bypass mode is a constant color bypass, the method proceeds to step 716. In step 716, the rasterizer 455 rasterizes the primitive to determine rasterization results such as fragments and coverage data. In step 718, the rasterizer sends the rasterization results and the constant color to ROP unit 465 for processing.

Referring back now to step 715, if the bypass mode is not constant color bypass, then the bypass mode is a gradient color bypass and the method proceeds to step 720. In step 720, rasterizer 455 rasterizes the primitive to determine rasterization results such as fragments and coverage data. In step 722, fixed point texture coordinate generator 530 generates gradient colors. In step 724, fixed point texture coordinate generator 530 sends the colors to ROP unit 465 for processing.

In sum, a graphics processing pipeline is provided with three bypass modes that enable the graphics processing pipeline to more effectively generate two-dimensional objects for display. In a textured bypass mode, a fixed point texture coordinate generator within a rasterizer calculates texture coordinates for textured two-dimensional objects to be rendered in the plane of the render target. The texture coordinates are sent to a texture unit and texture colors are fetched and sent to the ROP unit for blending. A pixel shader unit and texture coordinate generator unit (STRI unit) are not utilized to determine the color of the pixels generated or texture colors and, therefore, can be idled, switched to low-power mode, or utilized for other graphical operations. In a constant color rendering mode, the graphics processing pipeline renders a two-dimensional object in three-dimensional space, but without using the texture unit, pixel shader unit, or STRI unit. The rasterizer rasterizes the two-dimensional object with constant color values, and sends the results of the rasterization operations directly to the ROP unit for color blending, bypassing the pixel shader unit, texture unit and STRI unit. In a gradient color bypass mode, a fixed point texture coordinate within a rasterizer calculates linearly varying gradient colors for a gradient two-dimensional object to be rendered in the plane of the render target. Rasterizer rasterizes the gradient color two-dimensional object with gradient colors, and sends the results of the rasterization, including the gradient colors, directly to the ROP unit for color blending, bypassing the pixel shader unit, texture unit and STRI unit.

An advantage of the techniques provided herein is that a graphics processing pipeline can be configured to draw two-dimensional objects for display without using the pixel shader unit, thereby saving power and increasing overall performance. Another advantage of the techniques provided herein is that a blitter is not required to draw two-dimensional objects. Consequently, the graphics processing pipeline need not be flushed and idled while a blittler draws two-dimensional objects, thereby increasing overall performance. Yet another advantage of the techniques provided herein is that a graphics processing pipeline can be configured to draw two-dimensional objects using advantageous graphics operations, such as color blending, to improve overall image quality.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for drawing graphical objects within a graphics processing pipeline, the method comprising:
determining that a bypass mode for a first primitive is a no-bypass mode;
rasterizing the first primitive to generate a first set of rasterization results;

generating a first set of colors for the first set of rasterization results via a pixel shader unit;
rasterizing a second primitive to generate a second set of rasterization results;
generating a second set of colors for the second set of rasterization results without the pixel shader unit performing any processing operations on the second set of rasterization results; and
transmitting the first set of pixel colors and the second set of pixel colors to a raster operations (ROP) unit for further processing.

2. The method of claim 1, further comprising:
determining that a bypass mode for the second primitive is a textured bypass mode; and
calculating texture coordinates for the second set of rasterization results via a texture coordinate generator.

3. The method of claim 2, further comprising fetching colors from a texture unit based on the texture coordinates.

4. The method of claim 3, further comprising idling the pixel shader unit while the second set of colors is generated.

5. The method of claim 1, further comprising:
determining that a bypass mode for the second primitive is a fixed-color bypass mode; and
determining a fixed color for the second set of rasterization results.

6. The method of claim 5, further comprising transmitting the second set of colors to the ROP unit without either a texture coordinate generator unit or a texture unit performing any processing operations on the second set of colors.

7. The method of claim 6, further comprising idling the pixel shader unit while the second set of colors is generated.

8. The method of claim 1, further comprising:
determining that a bypass mode for the second primitive is a gradient color bypass mode;
calculating linear gradient colors via a texture coordinate generator; and
setting the second set of colors to be equal to the calculated linear gradient colors.

9. A graphics processing unit configured to draw graphical objects, comprising:
a rasterizer configured to rasterize a first primitive and a second primitive to generate a first set of rasterization results and a second set of rasterization results;
a pixel shader unit configured to determine that a bypass mode for the first primitive is a no-bypass mode and generate a first set of pixel colors for the first set of rasterization results; and
a raster operations (ROP) unit configured to receive the first set of pixel colors and a second set of pixel colors, wherein the second set of pixel colors are for the second set of rasterization results and are generated without the pixel shader unit performing any processing operations on the second set of rasterization results.

10. The graphics processing unit of claim 9, wherein:
the rasterizer is configured to determine that a bypass mode for the second primitive is a textured bypass mode, and a texture coordinate generator is configured to calculate texture coordinates for the second set of rasterization results.

11. The graphics processing unit of claim 10, wherein the texture coordinate generator is configured to send the texture coordinates to a texture unit.

12. The graphics processing unit of claim 11, wherein calculating the texture coordinates further comprises calculating the texture coordinates via fixed point arithmetic.

13. The graphics processing unit of claim 12, wherein the second primitive is processed without a geometry processing unit performing any processing operations on the second primitive.

14. The graphics processing unit of claim 11, wherein the pixel shader unit is configured to idle while the second set of colors is generated.

15. The graphics processing unit of claim 9, wherein:
the rasterizer is configured to determine that a bypass mode is a fixed color bypass mode for the second primitive; and
the rasterizer is configured to determine a fixed color for the second set of rasterization results.

16. The graphics processing unit of claim 15, wherein generating the second set of colors comprises setting each color in the second set of colors to be equal to the fixed color.

17. The graphics processing unit of claim 16, wherein the rasterizer is configured to send the second set of colors to the ROP unit without either a texture coordinate generator unit or a texture unit performing any processing operations on the second set of colors.

18. The graphics processing unit of claim 17, wherein the pixel shader unit is configured to idle while the second set of colors is generated.

19. The graphics processing unit of claim 9, wherein:
the rasterizer is configured to determine that a bypass mode is a gradient color bypass mode for the second primitive,
a texture coordinate generator is configured to calculate gradient colors, and
the rasterizer is configured to set the second set of colors to be equal to the calculated gradient colors.

20. A computing device comprising:
a graphics processing unit that includes:
a rasterizer configured to rasterize a first primitive and a second primitive to generate a first set of rasterization results and a second set of rasterization results,
a pixel shader unit configured to determine that a bypass mode for the first primitive is a no-bypass mode, and generate a first set of colors for the first set of rasterization results, and
a raster operations (ROP) unit configured to receive the first set of pixel colors and a second set of pixel colors, wherein the second set of pixel colors are for the second set of rasterization results and are generated without the pixel shader unit performing any processing operations on the second set of rasterization results.

* * * * *